United States Patent
Takashima et al.

(10) Patent No.: US 9,943,793 B2
(45) Date of Patent: Apr. 17, 2018

(54) POLYMER NANOFIBER STRUCTURAL BODY AND POLYMER NANOFIBER COMPOSITE USING THE STRUCTURAL BODY, AND METHODS OF PRODUCING THE STRUCTURAL BODY AND THE COMPOSITE

(71) Applicant: CANON KABUSHIKI KAISHA, Tokyo (JP)

(72) Inventors: Kenji Takashima, Tokyo (JP); Tetsuo Hino, Yamato (JP); Kazuhiro Yamauchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 14/662,892

(22) Filed: Mar. 19, 2015

(65) Prior Publication Data

US 2015/0273812 A1 Oct. 1, 2015

(30) Foreign Application Priority Data

Mar. 26, 2014 (JP) ................................ 2014-064114

(51) Int. Cl.
*B01D 46/00* (2006.01)
*D04H 1/728* (2012.01)
(Continued)

(52) U.S. Cl.
CPC ......... *B01D 46/0023* (2013.01); *D01D 5/003* (2013.01); *D04H 1/4374* (2013.01);
(Continued)

(58) Field of Classification Search
CPC ...... B01D 46/01; B01D 46/23; B01D 46/521; B01D 39/1623
See application file for complete search history.

(56) References Cited

U.S. PATENT DOCUMENTS

2011/0124941 A1* 5/2011 Verdegan ............. B01D 17/045
 585/818
2013/0298513 A1* 11/2013 Bodasinski ........ B01D 39/1623
 55/527
(Continued)

FOREIGN PATENT DOCUMENTS

JP 11-348159 A 12/1999
JP 2011-094281 A 5/2011
(Continued)

OTHER PUBLICATIONS

Takashima et al., U.S. Appl. No. 14/661,313, filed Mar. 18, 2015.
(Continued)

*Primary Examiner* — Heidi R Kelley
*Assistant Examiner* — Karla Hawkins
(74) *Attorney, Agent, or Firm* — Fitzpatrick, Cella, Harper & Scinto

(57) ABSTRACT

A method of producing a polymer nanofiber structural body of the present invention includes: forming, on a base material, a first layer in which polymer nanofibers are irregularly integrated by an electrospinning method; cutting the first layer together with the base material; and irradiating an argon beam from a base material side in parallel with a fracture surface to direct the length directions of the polymer nanofibers of the first layer on the base material side toward the thickness direction of the first layer to form a second layer different from the first layer in pore structure, thereby providing a polymer nanofiber structural body having a plurality of pore structures and free of any clear interface.

3 Claims, 6 Drawing Sheets

(51) Int. Cl.
  *D01D 5/00*   (2006.01)
  *D04H 1/4374*  (2012.01)
  *D01F 6/76*   (2006.01)

(52) U.S. Cl.
  CPC ............... *D04H 1/728* (2013.01); *D01F 6/76* (2013.01); *Y10T 156/1059* (2015.01)

(56) References Cited

U.S. PATENT DOCUMENTS

| | | |
|---|---|---|
| 2015/0218324 A1 | 8/2015 | Hino et al. |
| 2015/0273366 A1 | 10/2015 | Takashima et al. |
| 2015/0273377 A1 | 10/2015 | Takashima et al. |

FOREIGN PATENT DOCUMENTS

| | | |
|---|---|---|
| JP | 2012-219384 A | 11/2012 |
| JP | 2012-223254 A | 11/2012 |

OTHER PUBLICATIONS

Takashima et al., U.S. Appl. No. 14/662,500, filed Mar. 19, 2015.
Hino et al., U.S. Appl. No. 14/603,782, filed Jan. 23, 2015.
Yasufuku et al., U.S. Appl. No. 14/879,227, filed Oct. 9, 2015.
Takashima et al., U.S. Appl. No. 14/837,886, filed Aug. 27, 2015.
Notification of Reasons for Refusal in Japanese Application No. 2014-064114 (dated Dec. 19, 2017).

* cited by examiner

POLYMER NANOFIBER STRUCTURAL BODY AND POLYMER NANOFIBER COMPOSITE USING THE STRUCTURAL BODY, AND METHODS OF PRODUCING THE STRUCTURAL BODY AND THE COMPOSITE

BACKGROUND OF THE INVENTION

Field of the Invention

The present invention relates to a polymer nanofiber structural body having a plurality of pore structures therein and a composite obtained by using the structural body, and methods of producing the structural body and the composite.

Description of the Related Art

In recent years, industrial utilization of fine particles has become active. Meanwhile, a particle-collecting apparatus for collecting fine particles scattered in air or dispersed in a liquid has been needed. A polymer nanofiber structural body in which polymer nanofibers are integrated and three-dimensionally intertwined with each other typified by a polymer nanofiber sheet has been attracting attention as a material for such particle-collecting apparatus.

Unlike general fibers to be used in a nonwoven fabric and the like, each of the polymer nanofibers has a diameter of several micrometers or less. Accordingly, the polymer nanofiber structural body is drastically superior to a structural body including the general fibers because of the following reason. Even when the polymer nanofibers are integrated, an enormous specific surface area, a nanosize continuous pore structure, and a low density are obtained. By virtue of those properties, new functions such as a mechanical strength, reactivity, electrical and optical characteristics, and the permeability of the inside of the structural body can be imparted. In particular, when the pore structure is utilized, a pore diameter of the order of submicrons is obtained and hence the pore structure is suitable for the collection of fine particles. Further, each of the polymer nanofibers uses an organic compound as a parent material and hence is lightweight. In addition, the polymer nanofibers can be produced with ease and at a low cost.

Meanwhile, in order to selectively collect fine particles having different sizes, it has been necessary that the polymer nanofiber structural body have a plurality of pore structures therein. In addition, such a polymer nanofiber structural body that the ratio of a polymer nanofiber portion, i.e., the amount of polymer nanofibers present in the structural body is large has been needed for increasing the amount of the fine particles to be collected.

Japanese Patent Application Laid-Open No. 2012-223254 discloses a construction provided with a plurality of pore structures by integrating a nanofiber layer on a macrofiber layer. However, in the structural body disclosed in Japanese Patent Application Laid-Open No. 2012-223254, adhesion between the two fiber layers is low. Accordingly, the structural body may peel at an interface between the layers in the case where the structural body is used in a bent state like the case where the structural body is bonded to a curved surface. In view of the foregoing, Japanese Patent Application Laid-Open No. 2012-219384 discloses a construction in which interfacial adhesiveness between a base material layer and a nanofiber layer is improved by forming a bead-like structural body in a nanofiber upon integration of the nanofiber layer on the base material layer.

The composite disclosed in Japanese Patent Application Laid-Open No. 2012-219384 has high adhesiveness at an interface between the base material layer and the nanofiber layer. However, the clogging of a pore structure occurs owing to the bead-like structural body and hence the efficiency with which fine particles are collected reduces in some cases.

SUMMARY OF THE INVENTION

According to a first embodiment of the present invention, there is provided a polymer nanofiber structural body, including a first layer and a second layer different from each other in pore structure, in which: length directions of polymer nanofibers of the first layer are irregularly directed; in the second layer, number of polymer nanofibers whose length directions each form an angle of less than 45° with respect to a thickness direction of the second layer is larger than number of polymer nanofibers whose length directions each form an angle of 45° or more with respect to the thickness direction of the second layer; and the polymer nanofiber structural body includes polymer nanofibers extending over the first layer and the second layer.

According to a second embodiment of the present invention, there is provided a polymer nanofiber composite, including: a first layer and a second layer different from each other in pore structure; and a third layer different from the second layer in pore structure, in which: length directions of polymer nanofibers of the first layer and the third layer are irregularly directed; in the second layer, number of polymer nanofibers whose length directions each form an angle of less than 45° with respect to a thickness direction of the second layer is larger than number of polymer nanofibers whose length directions each form an angle of 45° or more with respect to the thickness direction of the second layer; the polymer nanofiber composite includes polymer nanofibers extending over the first layer and the second layer; and the polymer nanofibers of the second layer and the polymer nanofibers of the third layer are intertwined with each other at an interface between the second layer and the third layer.

According to a third embodiment of the present invention, there is provided a polymer nanofiber composite, including: a first layer and a second layer different from each other in pore structure; and a third layer and a fourth layer different from each other in pore structure, the second layer and the fourth layer being brought into contact with each other to be unified, in which: length directions of polymer nanofibers of the first layer and the third layer are irregularly directed; in each of the second layer and the fourth layer, number of polymer nanofibers whose length directions each form an angle of less than 45° with respect to a thickness direction of each of the second layer and the fourth layer is larger than number of polymer nanofibers whose length directions each form an angle of 45° or more with respect to the thickness direction of each of the second layer and the fourth layer; the polymer nanofiber composite includes polymer nanofibers extending over the first layer and the second layer; the polymer nanofiber composite includes polymer nanofibers extending over the third layer and the fourth layer; and the polymer nanofibers of the second layer and the polymer nanofibers of the fourth layer are intertwined with each other at an interface between the second layer and the fourth layer.

According to a fourth embodiment of the present invention, there is provided a method of producing the polymer nanofiber structural body of the first embodiment of the present invention, the method including: irregularly integrating polymer nanofibers on a base material to form a first layer; cutting the first layer in a thickness direction thereof together with the base material to expose a fracture surface; and irradiating an argon beam from a base material side in parallel with the fracture surface to turn a part of the first layer on the base material side into a second layer in which number of polymer nanofibers whose length directions each form an angle of less than 45° with respect to the thickness direction of the first layer is larger than number of polymer nanofibers whose length directions each form an angle of 45° or more with respect to the thickness direction of the first layer.

According to a fifth embodiment of the present invention, there is provided a method of producing the polymer nanofiber composite of the second embodiment of the present invention, the method including: forming a polymer nanofiber structural body on a first base material by the method of producing a polymer nanofiber structural body of the fourth embodiment of the present invention; irregularly integrating polymer nanofibers on a second base material to form a third layer; peeling the first base material from the polymer nanofiber structural body to expose the second layer; and bringing a surface of the second layer and a surface of the third layer into contact with each other, followed by pressurization to unify the polymer nanofiber structural body and the third layer.

According to a sixth embodiment of the present invention, there is provided a method of producing the polymer nanofiber composite of the third embodiment of the present invention, the method including: forming a first polymer nanofiber structural body on a first base material and a second polymer nanofiber structural body on a second base material by the method of producing a polymer nanofiber structural body of the fourth embodiment of the present invention; peeling the first base material from the first polymer nanofiber structural body to expose a second layer; peeling the second base material from the second polymer nanofiber structural body to expose a second layer; and bringing a surface of the second layer of the first polymer nanofiber structural body and a surface of the second layer of the second polymer nanofiber structural body into contact with each other, followed by pressurization to unify the first polymer nanofiber structural body and the second polymer nanofiber structural body.

Further features of the present invention will become apparent from the following description of exemplary embodiments with reference to the attached drawings.

DESCRIPTION OF THE EMBODIMENTS

Figure 1A:
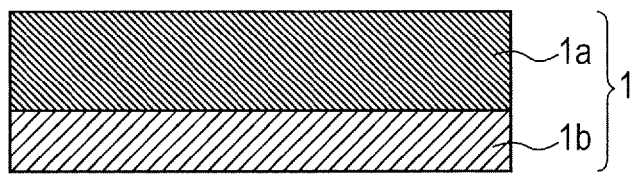
FIGS. 1A, 1B, 1C, and 1D are sectional views in a thickness direction schematically illustrating the constructions of a polymer nanofiber structural body and composite of the present invention, FIG. 1A illustrating the polymer nanofiber structural body of the present invention and FIGS. 1B, 1C and 1D each illustrating the polymer nanofiber composite of the present invention.

An object of the present invention is to provide a durable polymer nanofiber structural body that has a plurality of pore structures and hardly peels in the case of, for example, use on a curved surface.

A polymer nanofiber structural body of the present invention includes a first layer in which the length directions of polymer nanofibers are irregularly directed and a second layer most of the polymer nanofibers of which are directed toward its thickness direction, and has polymer nanofibers extending over the first layer and the second layer. In addition, the polymer nanofiber structural body can be produced by first forming the first layer and then turning a part of the first layer into the second layer through irradiation with an argon beam. Further, a polymer nanofiber composite of the present invention is produced by using the polymer nanofiber structural body, and is obtained by bringing the separately formed first layer or the second layer of a separately formed polymer nanofiber structural body into contact with the second layer of the structural body to unify the layers.

The present invention is hereinafter described in detail by way of an embodiment of the present invention. It should be noted that a known or well-known technology in the art is applied to a portion not particularly illustrated or described in the specification.

Polymer Nanofiber

The polymer nanofibers in the present invention contain at least one kind of polymer, and the length of each of the polymer nanofibers is longer than its thickness.

In the present invention, the average diameter (average fiber diameter) of the polymer nanofibers serving as an indicator of the thickness, which is not particularly limited, is preferably 1 nm or more to less than 10,000 nm. In particular, in order to obtain a polymer nanofiber structural body having a high specific surface area, the average fiber diameter is more preferably less than 1,500 nm because the number of fibers per space is limited when the fiber diameters are excessively large. It should be noted that when the average fiber diameter is less than 1 nm, the polymer nanofibers are difficult to handle from the viewpoint of the production of the polymer nanofiber structural body, and the average fiber diameter is preferably 50 nm or more from the viewpoint of the handling of the polymer nanofibers because the polymer nanofibers tend to be easy to handle.

In the present invention, the sectional shapes of the polymer nanofibers are not particularly limited, and specific examples of the shapes include a circular shape, an elliptical shape, a quadrangular shape, a polygonal shape, and a semicircular shape. It should be noted that the sectional shapes of the polymer nanofibers may not be such accurate shapes as listed above, and each of the polymer nanofibers may have different shapes at arbitrary sections.

Here, when it is hypothesized that the polymer nanofibers have shapes of columns, the diameters of circles serving as the sections of the columns correspond to the fiber diameters of the polymer nanofibers. In addition, when the polymer nanofibers do not have shapes of columns, the fiber diameters of the polymer nanofibers refer to the lengths of the longest straight lines passing centers of gravity in the sections of the polymer nanofibers. It should be noted that in the present invention, the length of each of the polymer nanofibers is typically 10 or more times as long as its fiber diameter.

The shapes of the polymer nanofibers (such as the sectional shapes of the fibers and the fiber diameters) can be confirmed by direct observation based on measurement with a scanning electron microscope (SEM) or laser microscope.

In the present invention, the polymer nanofibers are not particularly limited as long as the polymer nanofibers are each formed of at least an organic polymer component. A conventionally known polymer material can be used as the organic polymer, and one kind of such materials may be used alone, or two or more kinds thereof may be used in combination. In addition, a material containing a fine particle or a conventionally known filler can be used as the organic polymer, and the polymer can be formed by appropriately combining such materials.

A polymer material for the polymer nanofibers according to the present invention is not particularly limited as long as the material forms a nanofiber structural body, and is not particularly limited as long as the material forms a fibrous structure. Specific examples thereof include: an organic material typified by a resin material; and a hybrid material of the organic material and an inorganic material such as silica, titania, or a clay mineral. In addition, the material may be changed in the middle of the fibers.

Here, examples of the polymer material may include: a fluorine-containing polymer (such as tetrafluoroethylene or polyvinylidene fluoride (PVDF); the fluorine-containing polymer may include a copolymer of a fluorine-containing polymer and any other monomer (such as a copolymer of PVDF and hexafluoropropylene (PVDF-HFP))); a polyolefin-based polymer (such as polyethylene or polypropylene); polystyrene (PS); a polyarylene (aromatic polymer such as polyparaphenylene oxide, poly(2,6-dimethylphenylene oxide), or polyparaphenylene sulfide); polyimide; polyamide; polyamide imide; polybenzimidazole; a modified polymer obtained by introducing a sulfonic group (—SO$_3$H), a carboxy group (—COOH), a phosphoric group, a sulfonium group, an ammonium group, or a pyridinium group into a polyolefin-based polymer, polystyrene, polyimide, or a polyarylene (aromatic polymer); a modified polymer obtained by introducing a sulfonic group, a carboxy group, a phosphoric group, a sulfonium group, an ammonium group, or a pyridinium group into a skeleton of a fluorine-containing polymer; a polybutadiene-based compound; a polyurethane-based compound (including an elastomer-like compound or a gel-like compound); a silicone-based compound; polyvinyl chloride; polyethylene terephthalate; nylon; polyarylate and a biodegradable polymer (such as polycaprolactone (PCL) or polylactic acid); a polyether (such as polyethylene oxide (PEO) or polybutylene oxide); and a polyester (PES) (such as polyethylene terephthalate (PET)).

It should be noted that one kind of the polymer materials listed above may be used alone, or two or more kinds thereof may be used in combination. In addition, in the polymer material other than the polyolefin-based polymer, polystyrene, polyimide, the polyarylene, and the fluorine-containing polymer, there may be used a modified polymer obtained by introducing a sulfonic group, a carboxy group, a phosphoric group, a sulfonium group, an ammonium group, or a pyridinium group. Further, a copolymer obtained by copolymerizing a plurality of kinds of monomers may be used. In addition, in the case of a polymer material that is hardly caused to melt such as polyimide, polyamide, polyamide imide (PAI), or polybenzimidazole (PBI), the polymer material may be used in combination with, for example, a thermoplastic resin.

Examples of the inorganic material that can be used together with the organic polymer include oxides of metal materials selected from Si, Mg, Al, Ti, Zr, V, Cr, Mn, Fe, Co, Ni, Cu, Sn, and Zn. More specific examples thereof may include metal oxides such as silica (SiO$_2$), titanium oxide, aluminum oxide, alumina sol, zirconium oxide, iron oxide, and chromium oxide. In addition, a clay mineral such as montmorillonite (MN) may be used. Here, an inorganic material is preferably incorporated into each of the polymer nanofibers from the viewpoint of an improvement in durability because a mechanical strength tends to increase significantly upon joining of the polymer nanofibers.

In the present invention, the polymer nanofibers each preferably contain a functional group constituting a low-molecular weight epoxy compound. This is because the presence of the functional group facilitates additionally uniform dispersion of the low-molecular weight epoxy compound in each of the polymer nanofibers, and as a result, enables satisfactory and easy joining of the nanofibers by crosslinking. Here, the phrase "the polymer nanofibers each contain a functional group constituting a low-molecular weight epoxy compound" means that the following condition (a) or (b) is satisfied:

(a) a functional group in a repeating structure constituting each polymer nanofiber is identical or similar to at least part of a functional group skeleton constituting the non-crosslinkable moiety of the low-molecular weight epoxy compound; and (b) a substituent including oxirane is introduced into a polymer material constituting each polymer nanofiber.

The condition (a) or (b) is preferably satisfied from the viewpoint of an improvement in durability of the structural body because the mechanical strength of a polymer nanofiber material in the present invention tends to significantly improve. Here, the case where the condition (a) is satisfied is particularly preferred because a crosslinked structure can be formed by a method except a method involving causing the polymer material serving as a polymer nanofiber and the low-molecular weight epoxy compound to directly react with each other. It should be noted that the term "similar" in the condition (a) means that the main skeletons of functional groups to be compared are the same.

Here, examples of the functional group in the repeating structure constituting each polymer nanofiber, the functional group being a substituent serving as at least part of the functional group constituting the non-crosslinkable moiety, include an ether group, an aromatic ring, and a carbonyl group.

In addition, the case where the repeating structure constituting each polymer nanofiber includes an imide structure is preferred because heat resistance and a mechanical strength tend to be high by virtue of its rigid and strong molecular structure.

Polymer Nanofiber Structural Body

FIG. 1A illustrates a schematic sectional view in the thickness direction of the polymer nanofiber structural body of the present invention. A polymer nanofiber structural body 1 of the present invention has a first layer 1a and a second layer 1b different from each other in pore structure. A fiber existence ratio and an average pore diameter are available as quantitative indicators of a local structure determining the pore structures of the polymer nanofiber structural body.

In the present invention, the fiber existence ratio is the ratio of the polymer nanofibers per unit area. The fiber existence ratio is a value including information about the fiber diameters of the polymer nanofibers, the size of a portion (void portion) where no polymer nanofiber is present, and the ratio (void ratio) of the portion where no polymer nanofiber is present.

In addition, a pore in the polymer nanofiber structural body is a gap space produced by a plurality of adjacent polymer nanofibers when the nanofibers are not in contact with each other. The length of the smallest portion in an unspecified pore is defined as a partial pore diameter. When a plurality of polymer nanofibers are in close contact with each other and hence even a slight gap is not produced, the gap space is not referred to as "pore" and hence the partial pore diameter takes a value larger than zero. The average pore diameter in the present invention is the average of partial pore diameters in a specific space.

The partial pore diameter may take any value ranging from a small value to a large value irrespective of the states of the fiber diameters of the polymer nanofibers. However, the average pore diameter tends to be relatively small when the fiber diameters of the polymer nanofibers are small, and tends to be relatively large when the fiber diameters are large. The tendency becomes particularly significant as the fiber existence ratio in a space increases.

When the polymer nanofiber structural body is used as a particle-collecting apparatus, the polymer nanofiber structural body preferably has a plurality of different pore structures therein.

The polymer nanofiber structural body having a plurality of pore structures therein can be produced by, for example, separately producing polymer nanofiber structural bodies in each of which polymer nanofibers are irregularly integrated and bonding the structural bodies to each other. However, when two polymer nanofiber structural bodies in each of which polymer nanofibers are irregularly integrated are merely bonded to each other, a clear interface at which the integration state of the polymer nanofibers drastically changes is present. In addition, the polymer nanofibers become discontinuous on one side and the other side (opposite side) with respect to the interface. Accordingly, the application of a stress to such polymer nanofiber structural body is liable to cause the peeling of the structural body from the vicinity of the interface.

In order to prevent the occurrence of the peeling, polymer nanofibers are preferably continuous in two layers having different pore structures. That is, polymer nanofibers extending over the two layers having different pore structures are preferably present.

In the present invention, a polymer nanofiber structural body in which the polymer nanofibers extending over the two layers having different pore structures described above are present can be obtained by employing a production method to be described later. That is, the polymer nanofiber structural body 1 of the present invention includes the first layer 1a and the second layer 1b different from each other in pore structure. In the first layer 1a, the length directions of polymer nanofibers are irregularly directed, and in the second layer 1b, the length directions of polymer nanofibers are mainly directed toward the thickness direction of the second layer 1b. The layer in which the length directions of the polymer nanofibers are irregularly directed is hereinafter referred to as "irregular layer", and the layer in which the length directions of the polymer nanofibers are mainly directed toward its thickness direction is hereinafter referred to as "regular layer".

In the present invention, in the second layer 1b as a regular layer, number of polymer nanofibers whose length directions each form an angle of less than 45° with respect to the thickness direction of the second layer 1b is larger than number of polymer nanofibers whose length directions each form an angle of 45° or more with respect to the thickness direction of the second layer 1b, and the former polymer nanofibers preferably account for 80% or more of all the polymer nanofibers. It is more preferred that such polymer nanofibers that the angles are less than 30° account for 80% or more of all the polymer nanofibers. As described later, whether a layer is a regular layer is determined by: individually measuring the angles, lengths, and number of fibers in a pseudo-linear portion through image analysis; and confirming which one of the number of fibers each forming an angle of less than 45° with respect to its thickness direction and the number of fibers each forming an angle of 45° or more with respect to its thickness direction is larger.

In the present invention, the irregular layer and the regular layer are different from each other in fiber existence ratio and average pore diameter. As described later, the polymer nanofiber structural body of the present invention is produced by first forming the irregular layer and turning a part of the layer into the regular layer. In addition, when a part of the irregular layer turns into the regular layer, its thickness largely increases. Therefore, the fiber existence ratio of the irregular layer becomes larger than that of the regular layer, and the average pore diameter of the irregular layer becomes smaller than that of the regular layer.

In the polymer nanofiber structural body of the present invention, the thicknesses of the irregular layer and the regular layer are not particularly limited. However, the thickness of each of the layers is preferably larger than the average fiber diameter of the polymer nanofibers constituting the layer. When the thickness is smaller than the average fiber diameter, the structural body does not exhibit a substance-collecting force as a particle-collecting apparatus. In addition, when the thickness is excessively large, operability in the case where such structural body is used after having been adhered to any other member reduces. Accordingly, the thickness of each of the irregular layer and the regular layer is preferably 1,000 μm or less.

In addition, the fiber existence ratios of the first layer 1a and second layer 1b of the polymer nanofiber structural body of the present invention, which are not particularly limited, are preferably 1% or more to 97% or less, and are adjusted within such range so as to satisfy a relationship of (fiber existence ratio of first layer 1a)>(fiber existence ratio of second layer 1b). When the fiber existence ratio of the second layer 1b is less than 1%, the amount of the polymer nanofibers acting as a particle-collecting apparatus reduces and hence a collecting effect on a substance of a submicron size reduces. In addition, when the fiber existence ratio of the first layer 1a exceeds 97%, the following problem occurs: a substance hardly passes the pore portions of the polymer nanofibers or the collection of a slight amount of the substance results in the clogging of the pores.

The average pore diameters of the first layer 1a and second layer 1b of the polymer nanofiber structural body of the present invention, which are not particularly limited, are preferably 10 nm or more to 50,000 nm or less, and are adjusted within such range so as to satisfy a relationship of (average pore diameter of first layer 1a)<(average pore diameter of second layer 1b). The average pore diameters are particularly preferably less than 10,000 nm when the structural body is used as a particle-collecting apparatus for a substance of a submicron size. When the average pore diameter of the first layer 1a is less than 10 nm, its pores may be clogged by a capillary phenomenon upon adhesion of moisture in a gas as a droplet. On the other hand, when the average pore diameter of the second layer 1b exceeds 50,000 nm, its space is so large as compared to the fiber diameters that its strength reduces.

Method of Producing Polymer Nanofiber Structural Body

The polymer nanofiber structural body of the present invention is obtained by a production method including the steps of: first integrating polymer nanofibers on a base material to form an irregular layer; and then turning a part of the irregular layer into a regular layer.

A method of irregularly integrating the polymer nanofibers is not particularly limited. However, polymer nanofibers produced by employing, for example, an electrospinning method or a melt blow method alone or in combination may be used. The electrospinning method is a method involving forming the polymer nanofibers in a state in which a high voltage is applied between a polymer solution in a syringe and a collector electrode. When the method is adopted, the solution extruded from the syringe is provided with charge to scatter in an electric field. However, as the time lapses, a solvent in the scattered solution evaporates. As a result, a thinned solute appears. The thinned solute serves as a polymer nanofiber to adhere to a collector such as a substrate.

In the present invention, the irregular layer is preferably produced through spinning by the electrospinning method having the following characteristics (i) to (iii):
(i) various polymers can be spun into fiber shapes;
(ii) the control of a fiber shape is relatively easy and a fiber having a fiber diameter of from several nanometers to several tens of micrometers can be easily obtained; and
(iii) a production process is easy.

Figure 2:
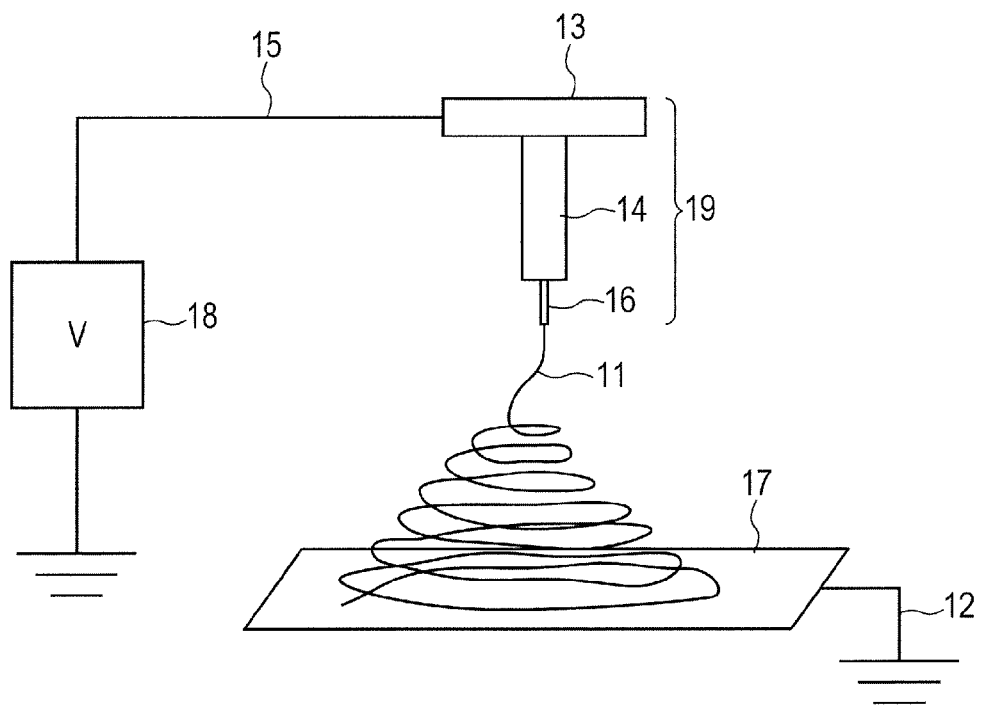
FIG. 2 is a schematic view illustrating an example of a manufacturing apparatus for forming the first layer of the polymer nanofiber structural body of the present invention.

Here, a method of producing the irregular layer based on the spinning of the polymer nanofibers by the electrospinning method is described with reference to the drawing. FIG. 2 is a schematic view illustrating an example of a manufacturing apparatus for the irregular layer formed of the polymer nanofibers of the present invention.

The manufacturing apparatus illustrated in FIG. 2 specifically adopts a method involving extruding a polymer solution stored in a storage tank 14 from a spinning nozzle 16. It should be noted that the polymer solution extruded from the spinning nozzle 16 scatters in all directions and hence an irregular layer in which spun polymer nanofibers are three-dimensionally intertwined with each other is naturally produced.

Next, the constituent members of the manufacturing apparatus of FIG. 2 are described. The storage tank 14 for storing the polymer solution is arranged through a connecting portion 13. It should be noted that the connecting portion 13 is electrically connected to a high-voltage power source 18 through a wiring 15. In addition, the connecting portion 13 and the storage tank 14 are each a constituent member of a head 19. A collector 17 in which the spun polymer nanofibers are collected is arranged so as to face the head 19 with a certain interval therebetween. It should be noted that the collector 17 is connected to the ground by a wiring 12.

The polymer solution is extruded from the tank 14 to the spinning nozzle 16 at a constant speed. A voltage of from 1 kV to 50 kV is applied to the spinning nozzle 16, and when electrical attraction exceeds the surface tension of the polymer solution, a jet 11 of the polymer solution is jetted toward the collector 17. At this time, a solvent in the jet gradually volatilizes, and upon arrival of the jet at the collector 17, the corresponding polymer nanofibers are obtained. Here, the polymer solution set to a condition under which the solution is turned into nanofibers is introduced into the tank 14 and spun. It should be noted that a material to be stored in the tank 14 at the time of the spinning is not limited to the polymer solution and a molten polymer heated to its melting point or more may be utilized.

In general spinning by the electrospinning method, the polymer nanofibers are integrated with their length directions irregularly directed. In addition, structures such as the fiber diameters and fiber existence ratio of the polymer nanofibers, and the average pore diameter and void ratio of the irregular layer largely depend on the kind of a polymer, a mixed additive and its ratio, the viscosity of the polymer solution, a temperature and humidity at the time of the production, and spinning conditions. Of the spinning conditions, in particular, the speed at which the polymer solution is extruded from the tank 14 to the spinning nozzle 16 and the voltage value of the power source largely affect the structures. The irregular layer of the polymer nanofibers having a desired pore structure is obtained by regulating those parameters.

It should be noted that in the present invention, the polymer nanofibers are integrated on the base material upon formation of the irregular layer of the polymer nanofibers. Such base material is arranged on the collector 17. The base material to be used in the present invention is preferably such that its potential can be controlled to the same potential as that of the collector 17. In addition, such base material is peeled upon formation of a polymer nanofiber composite to be described later in the present invention, and hence a material that is easy to peel is preferably used for the base material. Specifically, an aluminum foil can be preferably used.

Subsequently, a method of forming the regular layer of the polymer nanofibers is described with reference to FIGS. 3A to 3E.

Figure 3A:
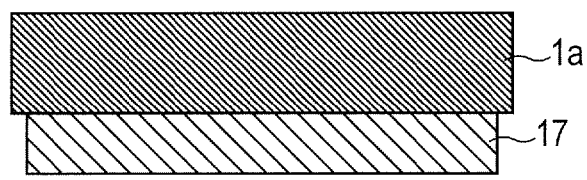
FIGS. 3A, 3B, 3C, 3D, and 3E are sectional views illustrating the steps of forming the second layer of the polymer nanofiber structural body of the present invention.

First, as illustrated in FIG. 3A, the irregular layer 1a of the polymer nanofibers integrated on the base material 17 is cut in its thickness direction together with the base material 17, whereby a fracture surface is exposed. Here, the cutting is preferably performed so that the end portions of the irregular layer 1a may protrude from the end portions of the base material 17 to some extent as illustrated in FIG. 3A. The length by which the irregular layer 1a protrudes is from about 5 μm to 100 μm.

Figure 3B:
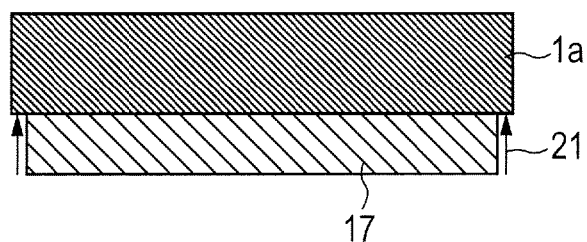

Next, as illustrated in FIG. 3B, an argon beam 21 is applied from a base material 17 side in parallel with the fracture surface of the irregular layer 1a. When the end portions of the irregular layer 1a protrude from the end portions of the base material 17 as illustrated in FIG. 3B, the protruding portions of the irregular layer 1a are irradiated with the argon beam 21.

Figure 3C:
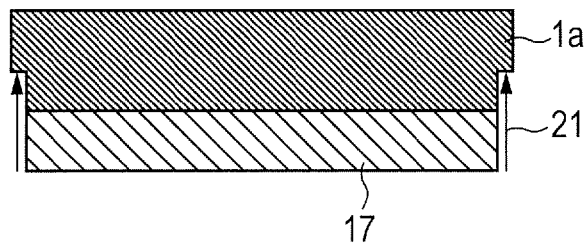
Figure 3D:
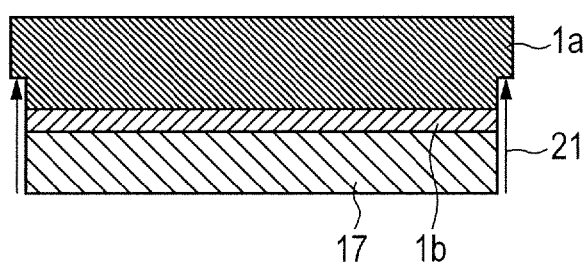
Figure 3E:
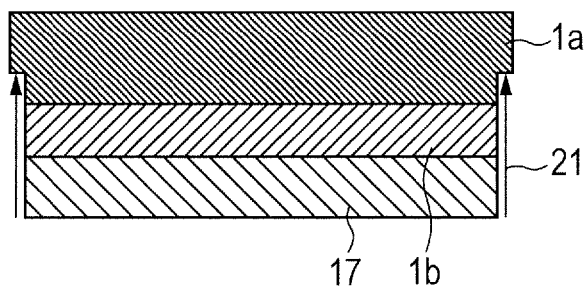

Thus, as illustrated in FIG. 3C, the polymer nanofibers of the irregular layer 1a irradiated with the argon beam 21 on the base material 17 side are thrust up and deposited on an upper portion. When the argon beam 21 is further applied, the site on which the nanofibers are deposited is thrust up by the argon beam 21 and hence the entirety of the irregular layer 1a is lifted by the argon beam 21. The polymer nanofibers of the irregular layer 1a on the base material 17 side stick to the base material 17 upon spinning. Accordingly, when the irregular layer 1a is lifted, as illustrated in FIG. 3D, the polymer nanofibers sticking to the base material 17 are pulled in the thickness direction of the irregular layer 1a and part of the nanofibers peel from the base material 17. When the argon beam 21 is continuously applied as it is, the polymer nanofibers are raised toward the upper portion while part of the nanofibers stick to the base material 17. Thus, their length directions are directed toward the thickness direction of the irregular layer 1a and hence the regular layer 1b is formed on the base material 17 side (FIG. 3E). That is, a part of the polymer nanofibers of the irregular layer 1a on the base material 17 side are pulled in the thickness direction of the irregular layer 1a, and hence their length directions follow the thickness direction and the regular layer 1b having a different pore structure is formed.

In the present invention, a part of the irregular layer 1a serves as the regular layer 1b. In that case, the thickness of the regular layer 1b becomes larger than the original thickness of the irregular layer 1a. When the thickness of the regular layer 1b becomes more than 20 times as large as the thickness of the irregular layer 1a, its fiber existence ratio becomes excessively small, its average pore diameter increases, and the strength of the structural body reduces. Accordingly, the thickness of the regular layer is preferably set to 20 or less times as large as the thickness of the irregular layer.

FIGS. 3A to 3E illustrate a mode in which the cutting is performed so that the end portions of the irregular layer 1a may protrude from the end portions of the base material 17 to some extent. However, the regular layer 1b can be formed even when the end portions of the base material 17 and the end portions of the irregular layer 1a are aligned with each other. The argon beam 21 expands, and hence the irradiation of the argon beam 21 along the fracture surface of the irregular layer 1a exhibits the following action: the argon beam 21 penetrates the fracture surface of the irregular layer 1a to thrust up the irregular layer 1a.

In addition, the argon beam 21 can be irradiated while being tilted toward a direction toward the inside of the irregular layer 1a. In this case, when a direction parallel to the fracture surface of the irregular layer 1a is defined as 0°, the beam can be tilted toward the inside by up to 30°. In addition, in the case where the argon beam 21 is tilted, its energy is preferably set to from 1 to 2 times as large as that in the case where the beam is parallel to the fracture surface.

Figure 4:
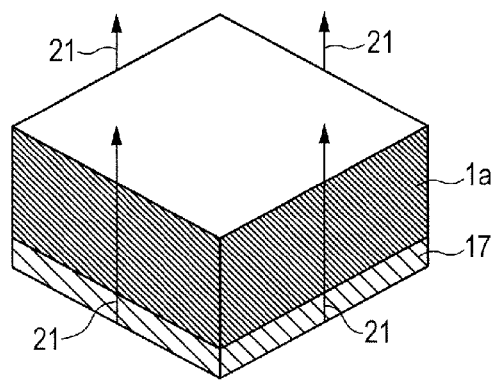
FIG. 4 is a perspective view illustrating the irradiation position of an argon beam in the step of forming the second layer of the polymer nanofiber structural body of the present invention.

The argon beam 21 only needs to be irradiated to at least one site for each fracture surface as illustrated in FIG. 4. In addition, in that case, the beam is irradiated to the central portion of a side on the upper end of each fracture surface. The argon beams 21 may be simultaneously irradiated to four sides illustrated in FIG. 4 or may be sequentially irradiated to the sides one by one. In consideration of efficiency, however, the simultaneous irradiation is preferred. In addition, a plurality of irradiation positions preferably exist for each side and the plurality of irradiation positions of each side are preferably set so as to be uniformly placed in the side. It should be noted that when the irradiation with the argon beam 21 is excessively strong, the irregular layer 1a may peel from the base material 17 before the formation of the regular layer 1b, and hence the energy and irradiation position of the argon beam 21 need to be appropriately adjusted. The energy of the argon beam 21 is from 1 kV to kV for one site in terms of an acceleration voltage intensity. When the energy is less than 1 kV, an action of thrusting up the irregular layer 1a is not sufficiently obtained. When the energy exceeds 6 kV, the polymer nanofibers themselves may be damaged and the argon beam 21 may reach the upper surface of the irregular layer 1a before the irregular layer 1a is thrust up.

The polymer nanofiber structural body of the present invention may be subjected to treatment involving adding another substance to its surface or inside, or treatment involving inducing a chemical reaction as required after its production. For example, a method involving performing heat treatment, a method involving bringing a compound into contact with the polymer nanofibers based on a wet or dry process, or a method involving performing both of the foregoing is available. It should be noted that an operation after the integration of the polymer nanofibers is preferably performed at a temperature equal to or less than the melting point of each of the polymer nanofibers.

As described above, in the polymer nanofiber structural body of the present invention, the polymer nanofibers extending over the irregular layer and the regular layer are present because part of the irregular layer is turned into the regular layer after the formation of the irregular layer. Accordingly, there is no clear interface between the irregular layer and the regular layer, and hence even when the structural body is bent, there is no risk in that peeling occurs between the irregular layer and the regular layer, and the structural body can be used after having been deformed into a desired shape.

Polymer Nanofiber Composite

Figure 1B:
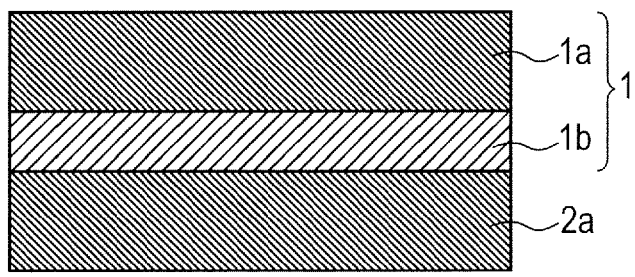
Figure 1C:
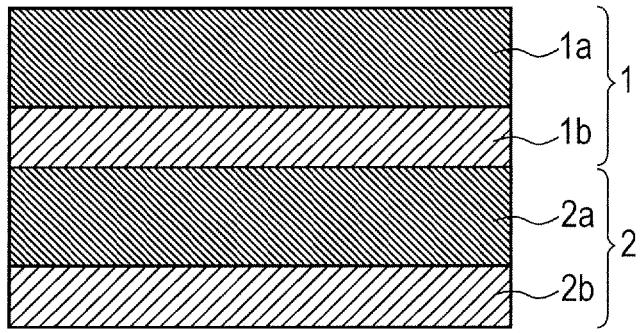
Figure 1D:
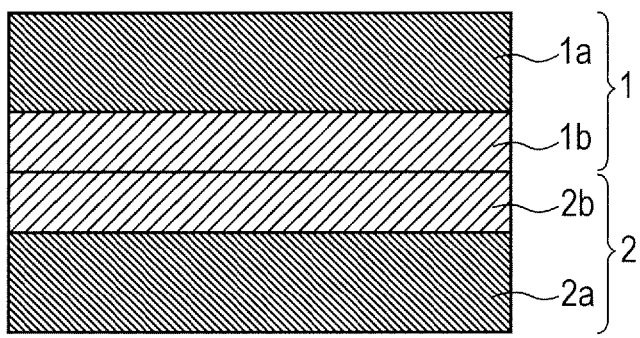

A polymer nanofiber composite of the present invention is described with reference to FIGS. 1A to 1D. The polymer nanofiber composite of the present invention illustrated in each of FIGS. 1B to 1D is produced by using the polymer nanofiber structural body 1 illustrated in FIG. 1A. Reference symbols are described.

Polymer nanofiber structural bodies are represented by reference symbols 1 and 2, a first layer is represented by reference symbol 1a, a second layer is represented by reference symbol 1b, a third layer is represented by reference symbol 2a, a fourth layer is represented by reference symbol 2b, a base material is represented by reference symbol 17, and an argon beam is represented by reference symbol 21.

The polymer nanofiber composite of FIG. 1B is obtained by unifying the second layer 1b of the polymer nanofiber structural body 1 of FIG. 1A and the third layer 2a as a separately formed irregular layer. In addition, the polymer nanofiber composite of FIG. 1C is obtained by: forming the two polymer nanofiber structural bodies 1 of FIG. 1A; and bringing the second layer 1b of the one structural body 1 and the third layer 2a of the other structural body 2 into contact with each other to unify the layers. Further, the polymer nanofiber composite of FIG. 1D is obtained by: forming the two polymer nanofiber structural bodies 1 of FIG. 1A; and bringing the second layer 1b of the one structural body 1 and the fourth layer 2b of the other structural body 2 into contact with each other to unify the layers. The third layer 2a of the other structural body 2 is the same irregular layer as the first layer 1a of the one structural body 1, and the fourth layer 2b thereof is the same regular layer as the second layer 1b of the one structural body 1.

When the composite is formed by using the polymer nanofiber structural bodies 1 and 2 of the present invention, adhesiveness in the case where the second layer 1b and the third layer 2a, or the second layer 1b and the fourth layer 2b, are brought into contact with each other is better than that in the case where the first layer 1a and the third layer 2a as irregular layers are brought into contact with each other. This is because the polymer nanofibers near the surface of the second layer 1b as the regular layer of the first structural body 1 are directed toward its thickness direction to a larger extent than the polymer nanofibers near the surface of the irregular layer 1a are. Such polymer nanofibers near the surface of the second layer 1b enter the pore portions of the third layer 2a or fourth layer 2b of the other structural body 2, which facilitates contact between the polymer nanofibers of the structural bodies. Accordingly, the polymer nanofibers are intertwined with each other to improve the adhesiveness. In particular, in the case where the second layer 1b and the fourth layer 2b are brought into contact with each other, the adhesiveness additionally improves because the number of the polymer nanofibers inserted so as to pierce through the insides of the structural bodies 1 and 2 is large.

In the polymer nanofiber composite of the present invention, the first layer 1a and third layer 2a illustrated in FIG. 1B, 1C, or 1D may be identical to or different from each other in pore structure. In addition, the second layer 1b and fourth layer 2b illustrated in FIG. 1C or 1D may be identical to or different from each other in pore structure.

In the construction of FIG. 1B or 1C, the average fiber diameter of the second layer 1b of the structural body 1 is larger than the average pore diameter of the third layer 2a. Accordingly, the amount of the polymer nanofibers of the second layer 1b to be inserted into the third layer 2a increases, and hence an opportunity for the contact increases to improve the adhesiveness.

In the construction of FIG. 1B or 1C, the thickness of the second layer 1b of the structural body 1 is larger than the average pore diameter of the third layer 2a of the structural body 2. Accordingly, the amount of the polymer nanofibers of the second layer 1b to be inserted into the third layer 2a increases, and hence an opportunity for the contact increases to improve the adhesiveness.

In the construction of FIG. 1D, it is preferred that: the average fiber diameter of the second layer 1b of the structural body 1 be larger than the average pore diameter of the fourth layer 2b of the structural body 2; and the average fiber diameter of the fourth layer 2b be larger than the average pore diameter of the second layer 1b. In such case, the amount of the polymer nanofibers constituting each structural body to be inserted into the other structural body increases, and hence the opportunity for the contact increases to improve the adhesiveness.

In addition, in the construction of FIG. 1D, one, or each of both, of the following conditions is preferably satisfied: the thickness of the second layer 1b of the structural body 1 is larger than the average pore diameter of the fourth layer 2b of the structural body 2; and the thickness of the fourth layer 2b is larger than the average pore diameter of the second layer 1b. When any such condition is satisfied, the amount of the polymer nanofibers to be inserted into the other structural body increases, and hence the opportunity for the contact increases to improve the adhesiveness.

Method of Producing Polymer Nanofiber Composite

The polymer nanofiber composite of the present invention uses a polymer nanofiber structural body produced by the method of producing a polymer nanofiber structural body of the present invention described in the foregoing.

A method of producing the polymer nanofiber composite of FIG. 1B is described.

First, the polymer nanofiber structural body 1 is produced on a base material by the production method of the present invention. Next, the second layer 1b is exposed by peeling the base material from the structural body 1. Meanwhile, the third layer 2a is formed by the same method as that of the first layer 1a of the polymer nanofiber structural body 1. At this time, the third layer 2a may be formed on a base material or no base material may be used. The exposed second layer 1b and the third layer 2a are brought into contact with each other, and the layers are pressurized to be unified.

Next, a method of producing the polymer nanofiber composite of FIG. 1C is described.

The first polymer nanofiber structural body 1 is formed on a first base material and the second polymer nanofiber structural body 2 is formed on a second base material by the production method of the present invention. The second layer 1b is exposed by peeling the first base material from the first polymer nanofiber structural body 1. The first polymer nanofiber structural body 1 and the second polymer nanofiber structural body 2 are unified by: bringing the exposed second layer 1b and the third layer 1a of the second polymer nanofiber structural body 2 into contact with each other; and pressurizing the layers.

Next, a method of producing the polymer nanofiber composite of FIG. 1D is described.

The first polymer nanofiber structural body 1 is formed on a first base material and the second polymer nanofiber structural body 2 is formed on a second base material by the production method of the present invention. The second layer 1b is exposed by peeling the first base material from the first polymer nanofiber structural body 1, and the fourth layer 2b is exposed by peeling the second base material from the second polymer nanofiber structural body 2. The first polymer nanofiber structural body 1 and the second polymer nanofiber structural body 2 are unified by: bringing the exposed second layer 1b and fourth layer 2b into contact with each other; and pressurizing the layers.

In the method of producing a polymer nanofiber composite of the present invention, a method of peeling a base material from a polymer nanofiber structural body is not particularly limited. However, it is preferred that the shapes of the polymer nanofibers be not changed at the time of the peeling, and such operations as described below are each available as a method by which the shapes are prevented from changing: the peeling is performed in a state in which the entire structure is solidified by cooling with liquid nitrogen; a keen metal such as a knife is brought into abutment with a portion at which the structural body and the base material are in contact with each other; and the base material is peeled while a base material side is pulled at the time of the peeling.

Structural Evaluations of Polymer Nanofiber Structural Body and Composite Thereof A process in which the polymer nanofibers are spun can be visually confirmed as long as their fiber diameters are several hundreds of nanometers or more. In addition, the process can be confirmed by direct observation with a SEM or a laser microscope after the spinning irrespective of the fiber diameters. In particular, in order to acquire information about the manner in which the states of the polymer nanofibers change in a direction from one surface to the other surface (thickness direction), the observation of a fracture surface exposed by cutting in the thickness direction is effective. Cutting with a knife, cutting by irradiation with an argon beam, or the like is effective in shaping the fracture surface.

With regard to the regular layer of a polymer nanofiber structural body, first, an image of a fracture surface of the polymer nanofiber structural body is photographed with a SEM or a laser microscope. Then, whether a layer is the regular layer is determined by integrating the lengths and numbers of fibers whose length directions each form an angle of less than 45° with respect to the thickness direction of the regular layer, and fibers whose length directions each form an angle of 45° or more with respect to the thickness direction of the regular layer, in a pseudo-linear portion in the image.

In addition, the average fiber diameter of the polymer nanofibers can be determined as described below. First, an image of fracture surfaces of the polymer nanofiber structural body and a composite thereof is photographed with a SEM or a laser microscope, and the image is captured in image analysis software. Then, the widths of the polymer nanofibers at 50 arbitrary points are measured.

A fiber existence ratio can be calculated as described below. First, an image of the fracture surfaces of the polymer nanofiber structural body and the composite is photographed with a SEM or a laser microscope, and the image is captured in image analysis software. After that, the image is binarized to be cut and divided into a polymer nanofiber existing portion and a polymer nanofiber non-existing portion. Then, the area ratio of the portion corresponding to the polymer nanofiber existing portion is calculated.

The average pore diameter of the entirety of the polymer nanofiber structural body and the composite can be measured with a pore diameter distribution-evaluating apparatus employing a bubble point method or a BET method. In addition, the average pore diameter in a local range can be determined as described below. The corresponding fracture surfaces of the polymer nanofiber structural body and the composite are photographed with a SEM or a laser microscope. Then, the resultant image is captured in image analysis software. After that, the shortest length in each gap between the polymer nanofibers is measured for 50 arbitrary points and the average of the measured values is calculated.

EXAMPLES

The present invention is hereinafter described by way of EXAMPLES. However, the present invention is not limited to EXAMPLES.

Polymer Nanofiber Structural Bodies 1 to 5

A polymer nanofiber structural body 1 was produced by using an electrospinning apparatus (NANON manufactured by MECC CO., LTD.). A syringe with a metallic needle was used as a storage tank for a polymer solution and an aluminum plate was used as a collector. A distance from a head where the metallic needle portion was placed to the collector was a constant value of 18 cm. Mounted on the collector was an aluminum foil as a base material on which the polymer nanofiber structural body was to be produced.

Prepared as a material for polymer nanofibers was a polymer solution obtained by dissolving a polyamide imide (PAI, VYLOMAX HR-13NX) in dimethylformamide (DMF) so that a solid content concentration became 25 mass %. The solution was flowed into the syringe with the metallic needle.

The syringe containing the solution was attached to the electrospinning apparatus, and the settings of the apparatus were adjusted so that the speed at which the solution was extruded became 1 ml/hour. As shown in TABLE 1, a voltage (upper voltage) applied by a power source to the spinning nozzle was set to 25 kV and the solution was spun for a spinning time of 6 minutes. Thus, an irregular layer in which the polymer nanofibers were irregularly integrated was formed.

Subsequently, a square measuring 8 cm by 8 cm when viewed from above was cut out of the irregular layer together with the aluminum foil as the base material by using a microtome. Then, as illustrated in FIG. 4, an argon beam was irradiated from an aluminum foil side along a fracture surface at the central portion of each 8-cm side in parallel with the fracture surface. The acceleration voltage and spot diameter of one argon beam were 4 kV and 300 μm, respectively, and the beams were sequentially applied to the respective sides for 4 hours each. Thus, the polymer nanofiber structural body 1 including the irregular layer and a regular layer was obtained. TABLE 1 shows conditions for the production of the polymer nanofiber structural body 1.

TABLE 1

| | Fiber material | Upper voltage | Spinning time | Acceleration voltage of one argon beam | Irradiation time for one site |
|---|---|---|---|---|---|
| Structural body 1 | PAI | 25 KV | 6 min | 4 eKV | 4 hours |
| Structural body 2 | PAI | 15 KV | 6 min | 4 eKV | 4 hours |
| Structural body 3 | PEO | 20 KV | 10 min | 3 eKV | 5 hours |
| Structural body 4 | PS | 20 KV | 10 min | 5 eKV | 4 hours |
| Structural body 5 | PVDF | 20 KV | 10 min | 4 eKV | 4 hours |

Polymer nanofiber structural bodies 2 to 5 were each produced in the same manner as in the production process for the polymer nanofiber structural body 1 except that production conditions shown in TABLE 1 were adopted.

Pore Structure Evaluation

A sample for pore structure observation was cut out of each of the polymer nanofiber structural bodies 1 to 5 with a microtome and a fracture surface was exposed.

The fracture surface was observed with a SEM (FE-SEM manufactured by Hitachi High-Technologies Corporation, S-4800) at an acceleration voltage of 3 kV. First, whether the regular layer in the polymer nanofiber structural body satisfied the regulation according to the present invention was confirmed. Further, whether the polymer nanofibers were continuously produced between the irregular layer and the regular layer was observed.

Figure 5:
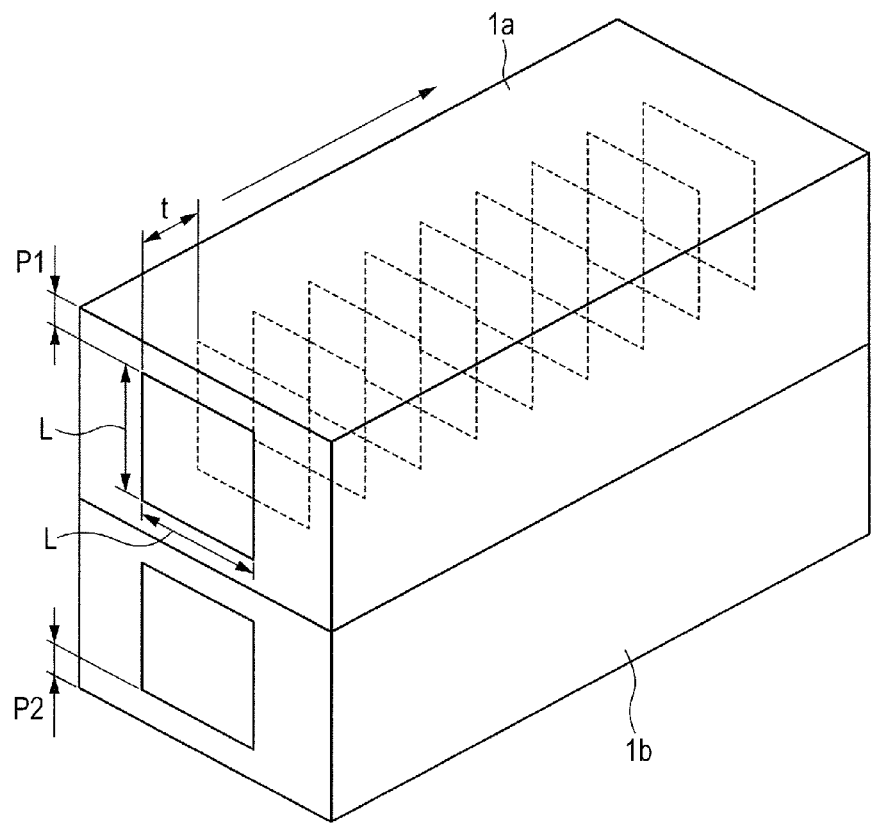
FIG. 5 is a perspective view illustrating the position at which a SEM image of the polymer nanofiber structural body is observed in EXAMPLES of the present invention.

After that, SEM images of a square 20 μm on a side further inside a portion inside the surface of the irregular layer by 5 μm, and a square 20 μm on a side further inside a portion inside the surface of the regular layer by 5 μm, in the fracture surface of the polymer nanofiber structural body were photographed. FIG. 5 illustrates an observation surface. In FIG. 5, the irregular layer and the regular layer are represented by reference symbols 1a and 1b, respectively, P1 and P2 each correspond to 5 μm, L corresponds to 20 μm, and a square represented by L×L is the observation surface. Ten observation surfaces of such type were photographed in a direction parallel to the surface (direction indicated by an arrow in the figure) at an interval t of 200 nm. It should be noted that FIG. 5 illustrates the observation surfaces of the irregular layer 1a and illustrates only the observation surface of the regular layer 1b exposed to the fracture surface for convenience, but ten observation surfaces of the regular layer 1b were also similarly photographed. Each SEM image was subjected to binarization treatment with image software "Image J" to be cut and divided into a polymer nanofiber portion and a void portion, and a fiber existence ratio was calculated from the average of the area ratios of the nanofibers on the ten respective surfaces.

In addition, the widths of the polymer nanofibers at 50 arbitrary points in each of the ten observation surfaces were measured and their average fiber diameter was determined. Further, the shortest length in each gap between the polymer nanofibers was measured for 50 arbitrary points and an average pore diameter was determined. TABLE 2 shows the fiber existence ratios, average fiber diameters, and average pore diameters of the respective polymer nanofiber structural bodies. It should be noted that in each of the polymer nanofiber structural bodies 1 to 5, polymer nanofibers whose length directions each formed an angle of less than 30° with respect to the thickness direction of the regular layer accounted for 80% or more of all the polymer nanofibers.

a bending test. The test is described with reference to FIGS. 6A to 6F. It should be noted that FIGS. 6A to 6F illustrate the bending test of a polymer nanofiber structural body but the same holds true for a polymer nanofiber composite.

TABLE 2

|  | Thickness | | Irregular layer | | | Regular layer | | |
| --- | --- | --- | --- | --- | --- | --- | --- | --- |
|  | Irregular layer | Regular layer | Average fiber diameter | Average pore diameter | Fiber existence ratio | Average fiber diameter | Average pore diameter | Fiber existence ratio |
| Structural body 1 | 50 μm | 30 μm | 700 nm | 1.6 μm | 52% | 700 nm | 2.5 μm | 37% |
| Structural body 2 | 50 μm | 20 μm | 800 nm | 2.2 μm | 45% | 800 nm | 3.0 μm | 31% |
| Structural body 3 | 60 μm | 30 μm | 750 nm | 1.5 μm | 51% | 750 nm | 2.4 μm | 37% |
| Structural body 4 | 70 μm | 30 μm | 900 nm | 2.0 μm | 47% | 900 nm | 3.1 μm | 29% |
| Structural body 5 | 70 μm | 20 μm | 600 nm | 1.8 μm | 52% | 600 nm | 2.7 μm | 35% |

Examples 1 to 9 and Comparative Examples 1 to 3

Next, a polymer nanofiber composite was produced by using the polymer nanofiber structural bodies 1 to 5 produced in the foregoing. Two of the polymer nanofiber structural bodies selected according to a combination shown in TABLE 3 were laminated, and the structural bodies were unified by being vibrated for 1 minute on a stage having attached thereto an ultrasonic vibrator under the application of a pressure of 0.98 N. With regard to the irregular layer serving as a contact surface, the aluminum foil as the base material adhering to its surface was peeled before the unification. At this time, the following method was employed: each structural body was cooled to low temperature in liquid nitrogen, and then the aluminum foil side was peeled while a knife was brought into abutment with the vicinity of a portion at which the surface and the base material were in contact with each other.

It should be noted that the polymer nanofiber structural body 1 was used as it was in EXAMPLE 1, the polymer nanofiber structural body 3 was used as it was in EXAMPLE 4, the structural body 4 was used as it was in EXAMPLE 6, and the structural body 5 was used as it was in EXAMPLE 8.

Peeling Resistance Evaluation

Figure 6A:
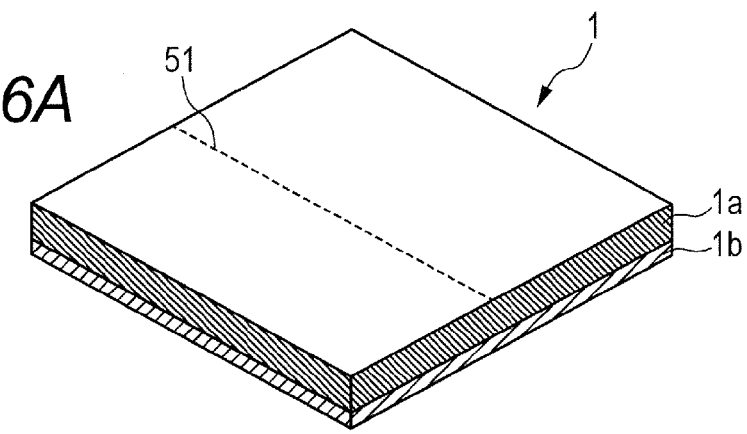
FIGS. 6A, 6B, 6C, 6D, 6E, and 6F are views illustrating the steps of the peeling resistance test of the polymer nanofiber structural body of the present invention.
Figure 6B:
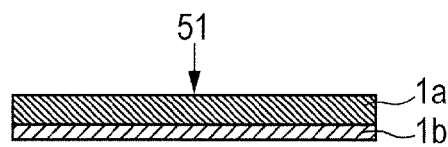
Figure 6C:
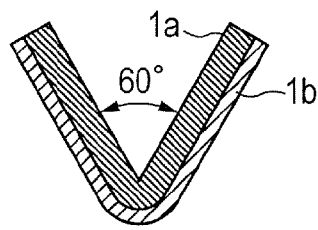
Figure 6D:
Figure 6E:
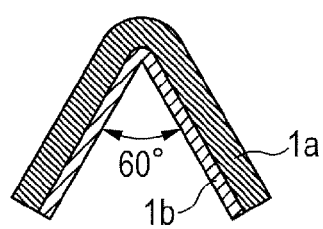
Figure 6F:
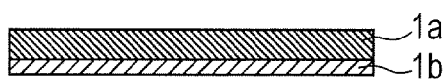
Figure 7:
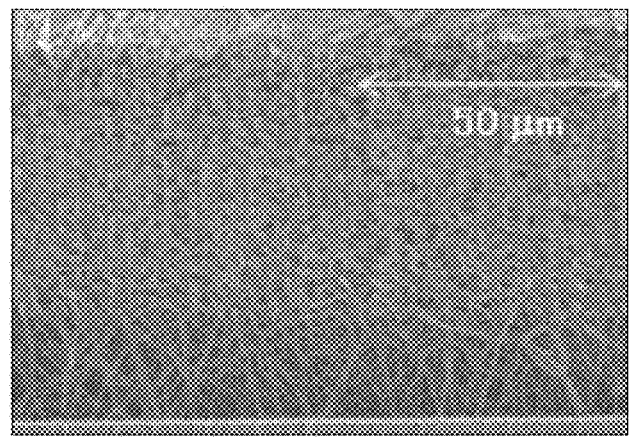
FIG. 7 shows a SEM image of a fracture surface of a polymer nanofiber structural body of EXAMPLE 1 of the present invention after the peeling resistance test.

The polymer nanofiber structural bodies and polymer nanofiber composites of EXAMPLES and COMPARATIVE EXAMPLES were each evaluated for peeling resistance by As illustrated in FIG. 6A, the polymer nanofiber structural body 1 is cut in its thickness direction into a predetermined size and defined as a sample for measurement. One fracture surface of the sample is defined as an observation surface, and an axis perpendicular to the fracture surface and parallel to the surface of the first layer 1a is defined as an axis 51 upon bending. A state in which the polymer nanofiber structural body 1 is flat (FIG. 6B) is defined as the initiation state of the bending test, and a bending angle at this time is defined as 0°. The structural body is bent about the axis 51 until the bending angle becomes 60° (FIG. 6C). Further, the bending angle is returned to 0° (FIG. 6D), the structural body is bent toward the opposite side until the bending angle becomes 60° (FIG. 6E), and the bending angle is returned to 0° again (FIG. 6F). The series of operations is defined as one set and the set is repeated 20 times. After the operations, the observation surface was observed with a laser microscope, and the case where no peeling occurred was determined as being good and the case where peeling occurred was determined as being bad depending on the presence or absence of the occurrence of the peeling. TABLE 3 shows the results. In addition, FIG. 7 shows a SEM photograph of the fracture surface of the polymer nanofiber structural body 1 of EXAMPLE 1 after the bending test. In FIG. 7, the upper two thirds of the paper surface in its vertical direction corresponds to the irregular layer and the lower one third thereof corresponds to the regular layer.

TABLE 3

|  | Structural body | Contact surface | Thickness | First surface | | | | Second surface | | | | Bending test |
| --- | --- | --- | --- | --- | --- | --- | --- | --- | --- | --- | --- | --- |
|  |  |  |  | Layer | Average fiber diameter | Average pore diameter | Fiber existence ratio | Layer | Average fiber diameter | Average pore diameter | Fiber existence ratio | |
| EXAMPLE 1 | 1 | — | 80 μm | Irregular layer | 700 nm | 1.6 μm | 52% | Regular layer | 700 nm | 2.5 μm | 37% | Good |
| EXAMPLE 2 | 1 | Regular layer | 130 μm | Structural body 1 Irregular layer | 700 nm | 1.6 μm | 52% | Structural body 2 Irregular layer | 800 nm | 2.2 μm | 46% | Good |
|  | 2 | Regular layer |  |  |  |  |  |  |  |  |  |  |
| EXAMPLE 3 | 1 | Irregular layer | 140 μm | Structural body 1 Regular layer | 700 nm | 2.5 μm | 38% | Structural body 2 Irregular layer | 800 nm | 2.2 μm | 46% | Good |
|  | 2 | Regular layer |  |  |  |  |  |  |  |  |  |  |
| EXAMPLE 4 | 3 | — | 90 μm | Irregular layer | 750 nm | 1.5 μm | 51% | Regular layer | 750 nm | 2.4 μm | 37% | Good |
| EXAMPLE 5 | 1 | Regular layer | 150 μm | Structural body 1 | 700 nm | 1.6 μm | 53% | Structural body 3 | 750 nm | 1.5 μm | 51% | Good |

TABLE 3-continued

|  | Structural body | Contact surface | Thickness | First surface Layer | First surface Average fiber diameter | First surface Average pore diameter | First surface Fiber existence ratio | Second surface Layer | Second surface Average fiber diameter | Second surface Average pore diameter | Second surface Fiber existence ratio | Bending test |
|---|---|---|---|---|---|---|---|---|---|---|---|---|
|  | 3 | Regular layer |  | Irregular layer |  |  |  | Irregular layer |  |  |  |  |
| EXAMPLE 6 | 4 | — | 100 μm | Irregular layer | 900 nm | 2.0 μm | 47% | Regular layer | 900 nm | 3.1 μm | 29% | Good |
| EXAMPLE 7 | 3 | Regular layer | 170 μm | Structural body 3 | 750 nm | 1.5 μm | 52% | Structural body 4 | 900 nm | 2.0 μm | 47% | Good |
|  | 4 | Regular layer |  | Irregular layer |  |  |  | Irregular layer |  |  |  |  |
| EXAMPLE 8 | 5 | — | 90 μm | Irregular layer | 600 nm | 1.8 μm | 52% | Regular layer | 600 nm | 2.7 μm | 35% | Good |
| EXAMPLE 9 | 1 | Regular layer | 160 μm | Structural body 1 | 700 nm | 1.6 μm | 53% | Structural body 5 | 600 nm | 2.7 μm | 36% | Good |
|  | 5 | Irregular layer |  | Irregular layer |  |  |  | Regular layer |  |  |  |  |
| COMPARATIVE EXAMPLE 1 | 1 | Irregular layer | 150 μm | Structural body 1 | 700 nm | 2.5 μm | 38% | Structural body 2 | 800 nm | 3.0 μm | 32% | Bad |
|  | 2 | Irregular layer |  | Regular layer |  |  |  | Regular layer |  |  |  |  |
| COMPARATIVE EXAMPLE 2 | 1 | Irregular layer | 170 μm | Structural body 1 | 700 nm | 2.5 μm | 37% | Structural body 3 | 750 nm | 2.4 μm | 37% | Bad |
|  | 3 | Irregular layer |  | Regular layer |  |  |  | Regular layer |  |  |  |  |
| COMPARATIVE EXAMPLE 3 | 3 | Irregular layer | 180 μm | Structural body 3 | 750 nm | 2.4 μm | 36% | Structural body 4 | 900 nm | 3.1 μm | 30% | Bad |
|  | 4 | Irregular layer |  | Regular layer |  |  |  | Regular layer |  |  |  |  |
| COMPARATIVE EXAMPLE 4 | 1 | Irregular layer | 170 μm | Structural body 1 | 700 nm | 2.5 μm | 37% | Structural body 5 | 600 nm | 2.7 μm | 35% | Bad |
|  | 5 | Irregular layer |  | Regular layer |  |  |  | Regular layer |  |  |  |  |

As described above by way of the embodiment and EXAMPLES, according to the present invention, the two layers different from each other in pore structure of the polymer nanofiber structural body have the polymer nanofibers extending over the layers, and hence there is no clear interface between the layers and the structural body hardly peels. In addition, in the composite obtained by using the polymer nanofiber structural body of the present invention, the polymer nanofibers of the two structural bodies are intertwined with each other at a contact surface between the structural bodies, and hence the composite hardly peels at the contact surface. Therefore, according to the present invention, there are provided a durable polymer nanofiber structural body and composite each of which: includes a plurality of pore structures therein; and has no risk of peeling at an interface even when used on a curved surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-064114, filed Mar. 26, 2014, which is hereby incorporated by reference herein in its entirety.

What is claimed is:

1. A polymer nanofiber structural body, comprising a first layer and a second layer different from each other in pore structure, wherein:
length directions of polymer nanofibers of the first layer are irregularly directed;
the second layer comprises polymer nanofibers whose length directions each form an angle of less than 45° with respect to a thickness direction of the second layer and polymer nanofibers whose length directions each form an angle of 45° or more with respect to the thickness direction of the second layer;
in the second layer, a number of the polymer nanofibers whose length directions each form the angle of less than 45° with respect to the thickness direction of the second layer is larger than a number of the polymer nanofibers whose length directions each form the angle of 45° or more with respect to the thickness direction of the second layer; and
the polymer nanofiber structural body includes polymer nanofibers extending over the first layer and the second layer.

2. A polymer nanofiber composite, comprising:
a first layer and a second layer different from each other in pore structure; and
a third layer different from the second layer in pore structure,
wherein:
length directions of polymer nanofibers of the first layer and the third layer are irregularly directed;
in the second layer, a number of polymer nanofibers whose length directions each form an angle of less than 45° with respect to a thickness direction of the second layer is larger than a number of polymer nanofibers whose length directions each form an angle of 45° or more with respect to the thickness direction of the second layer;
the polymer nanofiber composite includes polymer nanofibers extending over the first layer and the second layer; and the polymer nanofibers of the second layer and the polymer nanofibers of the third layer are intertwined with each other at an interface between the second layer and the third layer.

3. A polymer nanofiber composite, comprising:
a first layer and a second layer different from each other in pore structure; and
a third layer and a fourth layer different from each other in pore structure, the second layer and the fourth layer being brought into contact with each other to be unified, wherein:
length directions of polymer nanofibers of the first layer and the third layer are irregularly directed;
in each of the second layer and the fourth layer, a number of polymer nanofibers whose length directions each form an angle of less than 45° with respect to a thickness direction of each of the second layer and the fourth layer is larger than a number of polymer nanofibers whose length directions each form an angle of 45° or more with respect to the thickness direction of each of the second layer and the fourth layer;
the polymer nanofiber composite includes polymer nanofibers extending over the first layer and the second layer;
the polymer nanofiber composite includes polymer nanofibers extending over the third layer and the fourth layer; and
the polymer nanofibers of the second layer and the polymer nanofibers of the fourth layer are intertwined with each other at an interface between the second layer and the fourth layer.

* * * * *